(12) United States Patent
Rafferty

(10) Patent No.: US 8,436,712 B1
(45) Date of Patent: May 7, 2013

(54) SMART CARD APPARATUS

(76) Inventor: Kevin M. Rafferty, Hollywood, FL (US)

(*) Notice: Subject to any disclaimer, the term of this patent is extended or adjusted under 35 U.S.C. 154(b) by 334 days.

(21) Appl. No.: 12/576,314

(22) Filed: Oct. 9, 2009

(51) Int. Cl.
*G05B 19/00* (2006.01)
*G05B 23/00* (2006.01)

(52) U.S. Cl.
USPC .......................................... 340/5.61; 340/5.4

(58) Field of Classification Search ........ 340/5.61–5.66, 340/539.13, 539.15, 539.21, 539.23, 573.1, 340/573.6, 1.1, 5.1–5.2, 5.6, 5.4
See application file for complete search history.

(56) References Cited

U.S. PATENT DOCUMENTS

| | | | |
|---|---|---|---|
| 4,593,273 A | 6/1986 | Narcisse | |
| 5,590,038 A | 12/1996 | Pitroda | |
| 5,838,227 A | 11/1998 | Murray | |
| 5,955,961 A * | 9/1999 | Wallerstein | 340/5.4 |
| 5,963,130 A * | 10/1999 | Schlager et al. | 340/540 |
| D457,556 S * | 5/2002 | Hochschild | D19/9 |
| 6,581,839 B1 | 6/2003 | Lasch et al. | |
| 6,693,544 B1 | 2/2004 | Hebbecker | |
| 6,738,772 B2 * | 5/2004 | Regelski et al. | 707/10 |
| H2120 H * | 7/2005 | Cudlitz | 235/382 |
| 6,952,155 B2 * | 10/2005 | Himmelstein | 340/5.52 |
| 7,191,952 B2 | 3/2007 | Blossom | |
| 2003/0189402 A1 * | 10/2003 | Gaudiana et al. | 313/507 |
| 2005/0011776 A1 * | 1/2005 | Nagel | 206/39 |
| 2006/0240806 A1 * | 10/2006 | Demirbasa et al. | 455/412.1 |
| 2007/0060305 A1 * | 3/2007 | Amaitis et al. | 463/25 |
| 2008/0278338 A1 * | 11/2008 | Krell | 340/573.6 |
| 2009/0294524 A1 * | 12/2009 | Rice et al. | 235/380 |

FOREIGN PATENT DOCUMENTS

JP 11306310 A * 11/1999
WO WO 2006084187 A1 * 8/2006

* cited by examiner

*Primary Examiner* — Daniel Wu
*Assistant Examiner* — Kam Ma

(57) ABSTRACT

The card has a magnetic strip with pertinent information encoded by the issuer. The magnetic strip provides monetary transaction capability, facility access, security access, and privilege access so that the card can be encoded as desired by the issuer. The magnetic strip and CPU also include medical information of a user. The card also has a battery pack that is in communication with the internally housed transponder, CPU, and GPS capability. By way of the antenna, the transponder communicates with an existing GPS transponder. A distance limitation is encoded into the card. When the card exceeds the distance limitation, the existing transponder is alarmed. The existing GPS transponder receives location information from the card so that the card user can be recovered.

2 Claims, 3 Drawing Sheets

SMART CARD APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Credit type cards are often issued to customers so that room numbers, other personal information, and monetary capabilities are present. Cruise lines are excellent examples of such card usage. Rather than using a personal credit card, cruise lines issue personal cards with pertinent information disposed on the card. Information, facility access, security access, and monetary transaction capabilities may be disposed on and within the cards in the form of a magnetic strip and other devices. Cruise lines and other similar issuers also provide excellent examples of entities that need more than just these limited card functions. To that end, the present smart card apparatus provides multiple card functions not previously found in the art.

FIELD OF THE INVENTION

The smart card apparatus relates to credit cards and the like and more especially to a card with personal and business information, access privileges, monetary transaction capability, and GPS and transponder.

SUMMARY OF THE INVENTION

The general purpose of the smart card apparatus, described subsequently in greater detail, is to provide a smart card apparatus which has many novel features that result in an improved smart card apparatus which is not anticipated, rendered obvious, suggested, or even implied by prior art, either alone or in combination thereof.

To attain this, the smart card apparatus provides a card resembling a credit card. The card's dimensions are limited to about 3 inches in length, about 1½ inches in width, and about 1/16 inch thickness. The card is importantly impact resistant and waterproof. Like most credit cards, the card has a magnetic strip with pertinent information encoded by the issuer. The magnetic strip of the most complete embodiment provides monetary transaction capability, facility access, security access, and privilege access so that the card can be encoded as desired by the issuer. The magnetic strip and CPU may also include medical information of a user.

The card also has a battery pack that is in communication with the internally housed transponder, CPU, and GPS capability. By way of the antenna, the transponder communicates with an existing GPS transponder. A distance limitation is encoded into the card. When the card exceeds the distance limitation, the existing transponder is alarmed. The card's GPS capability informs the GPS transponder of the card's location. This feature importantly provides safety for the card user. For example, if a passenger of a cruise line falls overboard, the existing GPS transponder is alarmed when the distance information is exceeded. The existing GPS transponder receives location information from the card, and the card user can be rescued. Use of this feature is not limited to cruise lines.

Thus has been broadly outlined the more important features of the improved smart card apparatus so that the detailed description thereof that follows may be better understood and in order that the present contribution to the art may be better appreciated.

An object of the smart card apparatus is to provide a relatively small and thin card with multiple functions.

Another object of the smart card apparatus is to provide monetary transaction capabilities.

A further object of the smart card apparatus is to provide personal identification.

An added object of the smart card apparatus is to prevent injury to and loss of individuals.

And, an object of the smart card apparatus is to automatically notify an existing GPS transponder of an out-of-range condition.

An object of the smart card apparatus is to provide facility access.

Another object of the smart card apparatus is to provide security access.

A further object of the smart card apparatus is to provide privilege access.

And, it is an object of the smart card apparatus to be durable.

These together with additional objects, features and advantages of the improved smart card apparatus will be readily apparent to those of ordinary skill in the art upon reading the following detailed description of presently preferred, but nonetheless illustrative, embodiments of the improved smart card apparatus when taken in conjunction with the accompanying drawings.

In this respect, before explaining the current embodiments of the improved smart card apparatus in detail, it is to be understood that the smart card apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved smart card apparatus. It is therefore important that the claims be regarded as including such equivalent constructions insofar as they do not depart from the spirit and scope of the smart card apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the smart card apparatus generally designated by the reference number 10 will be described.

Figure 3:
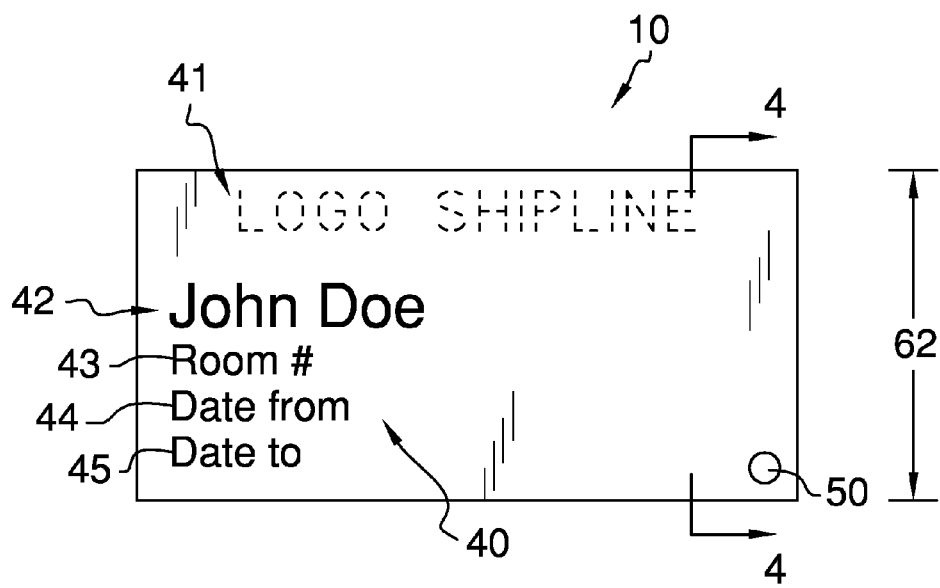
FIG. 3 is a front elevation view.
Figure 4:
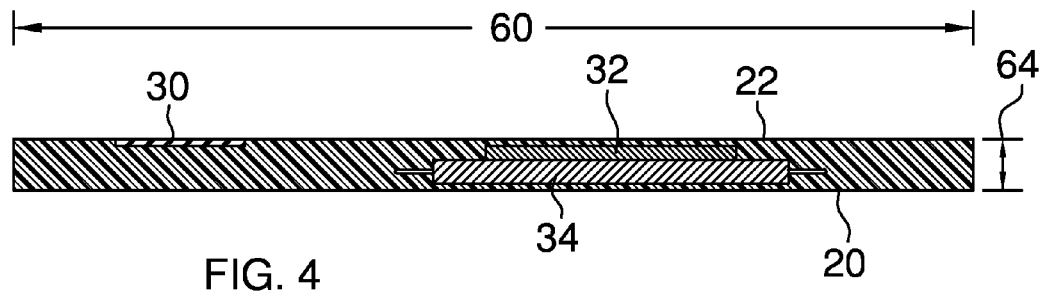
FIG. 4 is a cross sectional view of FIG. 3, taken along the line 4-4.

Referring to FIGS. 3 and 4, the apparatus 10 comprises the hexagonal card 18 having a length 60 of about 3 inches, a width 62 of about 1½ inches, and a front 20 spaced apart from a back 22 by a thickness 64 of about 1/16 inch. The orifice 50 is disposed through the card 18 and provides a means for fastening to an existing lanyard or other device.

Figure 1:
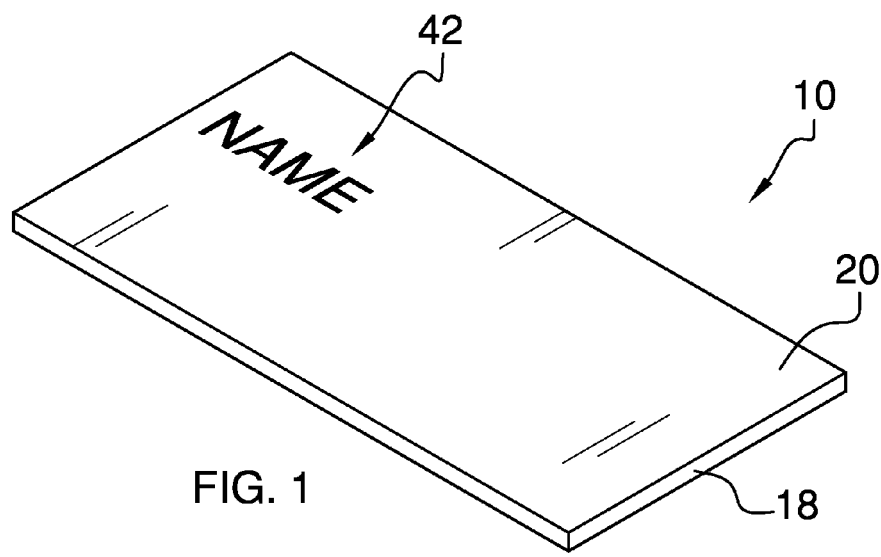
FIG. 1 is a front perspective view.

Referring to FIGS. 1 and 3, a logo 41 printed on the front 20. The logo 41 may be of an issuing entity or an advertisement or any desired insignia or information. A plurality of indicia 40 is printed on the front 20 below the logo 41. The indicia 40 comprise a name 42, a room indication 43, an issue date 44, and an expiration date 45.

Figure 2:
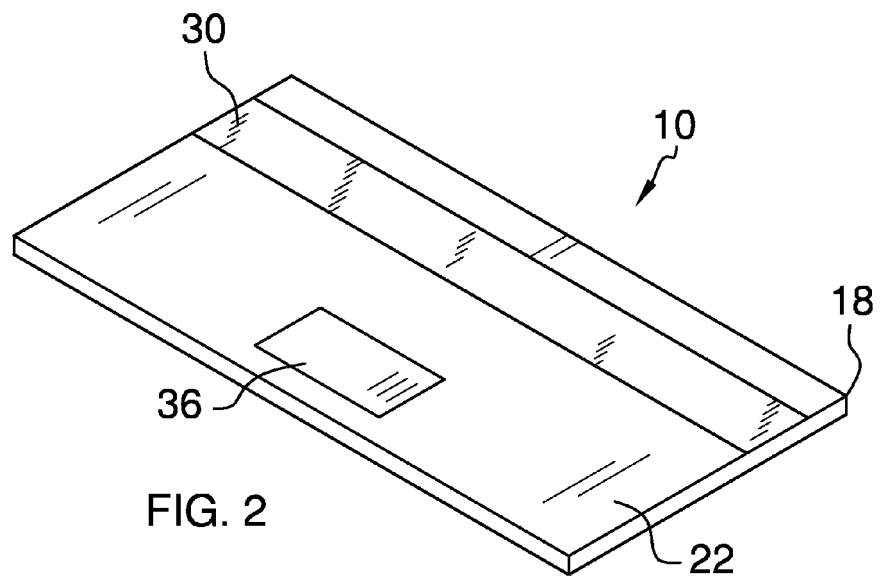
FIG. 2 is a back perspective view.
Figure 5:
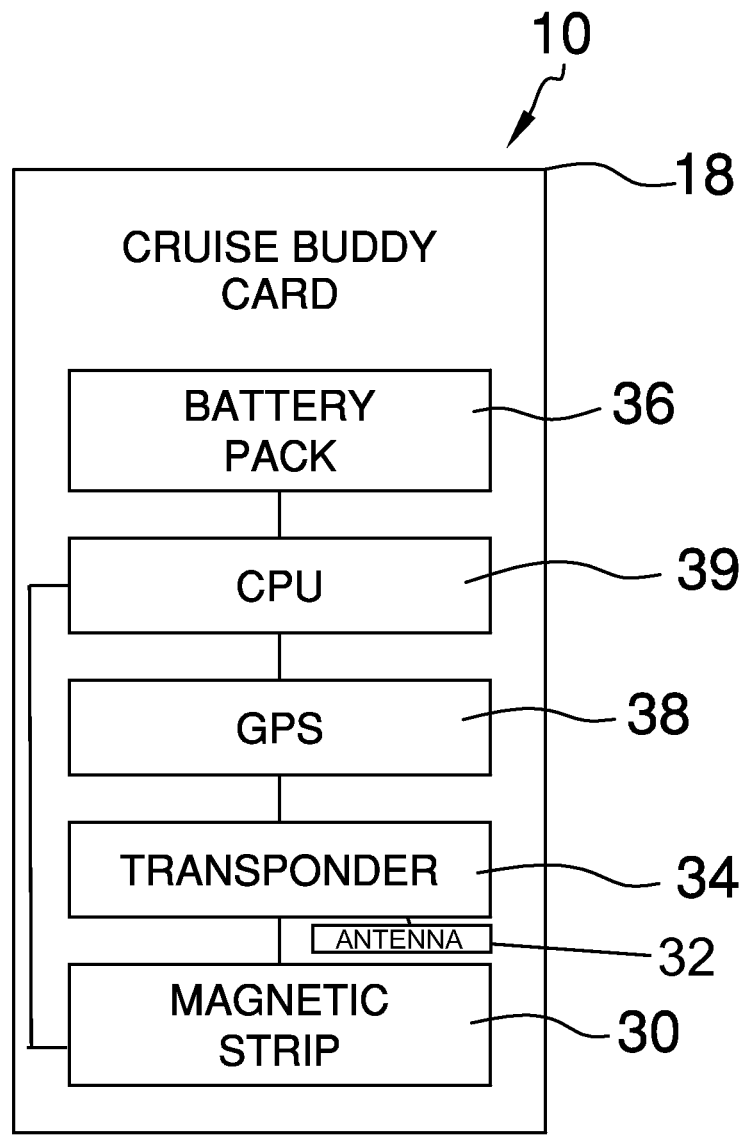
FIG. 5 is a schematic block diagram of electronics of the card and of the magnetic strip associated therewith.

Referring to FIGS. 2, 4, and 5, the magnetic strip 30 is disposed within the back 22 of the card 18. The magnetic strip 30 provides monetary transaction capability, facility access, security access, personal information, privilege access, and other encoded information used by card users and issuing entities. The CPU 39 is disposed within the card 18. The CPU 39 is in communication with the magnetic strip 30. GPS capability 38 is disposed within the card 18. The transponder 34 is disposed within the card 18 and is in communication with an existing GPS transponder and with the GPS capability 38. The existing GPS transponder is known in the GPS arts. An antenna 32 is disposed within the card and is in communication with the transponder 34. The CPU 39 is encoded with a distance limitation wherein the existing GPS transponder is alerted of the card 18 exceeding the distance limitation. The transponder 34 then communicates the location of the card 18. The battery pack 36 is disposed within the card 18 back 22. The battery pack 36 is in communication with the CPU 39 and the transponder 34. The CPU can also communicate with the magnetic strip by the transponder 34 which, in turn, communicates with the GPS 38 that is in communication with the CPU. The CPU 39 both receives input from and provides output to the magnetic strip 20 regarding monetary transactions, facility access, security access, personal information, privilege access and other encoded information used by card users and issuing entities as well as medical information of a user.

With respect to the above description then, it is to be realized that the optimum dimensional relationships for the parts of the smart card apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the smart card apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the smart card apparatus may be used.

Therefore, the foregoing is considered as illustrative only of the principles of the smart card apparatus. Further, since numerous modifications and changes will readily occur to those skilled in the art, it is not desired to limit the smart card apparatus to the exact construction and operation shown and described, and accordingly, all suitable modifications and equivalents may be resorted to, falling within the scope of the smart card apparatus.

What is claimed is:

1. A smart card apparatus consisting of, in combination:
   a card having a length of about 3 inches, a width of about 1½ inches, and a front spaced apart from a back by a thickness of about 1/16 inch;
   a logo printed on the front
   a plurality of indicia printed on the front below the logo;
   an orifice disposed through the card;
   a magnetic strip disposed within the back of the card, the magnetic strip providing monetary transaction capability, facility access, security access, and privilege access;
   a CPU disposed within the card, the CPU in communication with the magnetic strip, the CPU encoded with a distance limitation;
   a GPS capability disposed within the card;
   a transponder disposed within the card, the transponder in communication with an existing GPS transponder and with the GPS capability;
   an antenna disposed within the card, the antenna in communication with the transponder disposed within the card;
   a battery pack disposed within the card back, the battery pack in communication with the CPU and the transponder.

2. A smart card apparatus consisting of, in combination:
   a card having a length of about 3 inches, a width of about 1½ inches, and a front spaced apart from a back by a thickness of about 1/16 inch;
   a logo printed on the front
   a plurality of indicia printed on the front below the logo, the indicia consisting of:
   a name;
   a room indication;
   an issue date;
   an expiration date;
   an orifice disposed through the card;
   a magnetic strip disposed within the back of the card, the magnetic strip providing monetary transaction capability, facility access, security access, personal information, and privilege access;
   a CPU disposed within the card, the CPU in communication with the magnetic strip;
   a GPS capability disposed within the card;
   a transponder disposed within the card, the transponder in communication with an existing GPS transponder and with the GPS capability;
   an antenna in communication with the transponder disposed within the card;
   a battery pack disposed within the card back, the battery pack in communication with the CPU and the transponder.

* * * * *